US005997630A

United States Patent [19]

Angelskar et al.

[11] Patent Number: 5,997,630

[45] **Date of Patent: *Dec. 7, 1999**

[54] CONCRETE ACCELERATORS

[75] Inventors: Terye Angelskar, Schlieren; Helmut Gebhardt, Zurich; Bernhard Leikauf, Linn; Valentina Mader, Nussbaumen, all of Switzerland

[73] Assignee: MBT Holding AG, Zurich, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,822

[22] Filed: Jun. 28, 1996

[30] Foreign Application Priority Data

Jun. 28, 1995 [GB] United Kingdom .................. 9513116

[51] Int. Cl.$^6$ .................................................. C04B 24/12

[52] U.S. Cl. ......................... 106/696; 106/724; 106/727; 106/819; 106/823

[58] Field of Search ................................... 106/696, 724, 106/727, 819, 823

[56] References Cited

U.S. PATENT DOCUMENTS

| | | | |
|---|---|---|---|
| 4,296,006 | 10/1981 | Bugdahl et al. | 427/137 |
| 4,507,154 | 3/1985 | Burge et al. . | |
| 5,051,130 | 9/1991 | Futami et al. | 106/35 |
| 5,453,123 | 9/1995 | Burge et al. | 106/708 |
| 5,753,037 | 5/1998 | Drs et al. | 106/823 |

FOREIGN PATENT DOCUMENTS

| | | | |
|---|---|---|---|
| 930047466 | 5/1994 | Australia . | |
| A-47466/93 | 5/1994 | Austria . | |
| 9201644 | 2/1992 | European Pat. Off. . | |
| 19628553 | 9/1997 | Germany . | |
| 5051745 | 4/1980 | Japan | 106/819 |
| 55-69508 | 5/1980 | Japan . | |
| 59-78926 | 5/1984 | Japan . | |
| 0102173 | 4/1990 | Japan . | |
| 0196839 | 8/1990 | Japan . | |
| 0481448 | 3/1992 | Japan . | |
| 06271370 | 9/1994 | Japan . | |
| 0305045 | 11/1995 | Japan . | |
| 0499172 | 1/1939 | United Kingdom . | |
| 1538103 | 1/1979 | United Kingdom . | |
| WO 9318909 | 9/1993 | WIPO . | |
| WO95/28362 | 10/1995 | WIPO . | |
| WO 96/05150 | 2/1996 | WIPO . | |
| WO 9818740 | 5/1998 | WIPO . | |

OTHER PUBLICATIONS

Derwent Publication XP002077176 and SU 1 509 344 A dated Sep. 23, 1989.

Chemical Abstracts, vol. 104, No. 22, Jun. 2, 1986 JP 6114161 (Jan. 22, 1986).

Derwent Publication 94–183962, of AU 930047466 (Sep. 20, 1993).

"Increasing the Strength of High Alumina Cements" Szilikatip Szilikatted Kerf (Eloadisik), 13$^{th}$ vol. 3 p 151–6 Kuznetsova et al. 1981.

*Primary Examiner*—Paul Marcantoni

*Attorney, Agent, or Firm*—Fish & Richardson P.C.

[57] ABSTRACT

An accelerating admixture for use with spraying cementitious compositions such as shotcrete comprises (a) a compound selected from aluminium hydroxide, aluminium hydroxysulphate and mixtures thereof, and (b) an acidic substance which essentially does not react with the compound. The preferred acid substances are organic acids.

19 Claims, No Drawings

CONCRETE ACCELERATORS

This invention relates to accelerators for use with cementitious compositions which are to be applied by spraying such as cementitious compositions which are applied by shotcrete methods.

The application of cementitious compositions to substrates such as rock faces by spraying is a well known technology. The requirements that the composition be sufficiently fluid to be conveyed to a spray nozzle and harden very quickly on striking the substrate have been satisfied by the injection at the nozzle of an accelerator. Traditional accelerators have included such substances as "water glass" (sodium silicate), sodium aluminate, calcium chloride and alkali metal hydroxides. While these materials have delivered good performance, the highly alkaline nature of many of them has made conditions in the vicinity of spraying operations, especially in enclosed spaces such as tunnels, very unpleasant, necessitating protective equipment.

As a result, there has been a considerable interest in the development of alkali-free accelerators for sprayable cementitious compositions. One example is the use of mixtures which include aluminium hydroxide. For example, European Patent 0 076 927 describes an alkali free accelerator which comprises aluminium hydroxide in combination with one or more soluble aluminium salts. Aluminium hydroxide performs well, but has a major drawback in that aqueous dispersions of aluminium hydroxide (ready for immediate use) are not storage-stable, becoming useless after only a few days.

It has now been found that a combination of certain aluminium compounds with certain acids allows the preparation of a storage-stable admixture. Moreover, it also allows achievement of higher performance at low alkaline levels. There is therefore provided, according to the present invention, an acid containing accelerating admixture for a sprayable cementitious composition, comprising a compound selected from aluminium hydroxide, aluminium hydroxysulphate and mixtures thereof and an acidic substance which essentially does not react with the compound.

The aluminium hydroxide and aluminium hydroxysulphate used in this invention are readily-available commercial materials. The hydroxysulphate performs particularly well and is the preferred material for the purposes of this invention. A typical example of the material is "Gezedral" L (trade mark) of Giulini Chemie GmbH, Ludwigshafen/Rhein, Germany.

By "acidic substance" is meant a substance which in aqueous solution has a pH of less than 7. It is essential for the purposes of this invention that the substance be at least sparingly soluble in water. It is also essential that the acidic substance essentially not react with the compound; by this is meant that, while a slight degree of reaction is not detrimental, there should not be a substantial degree of reaction which changes the essential nature of the compound. Preferably no more than 10% of the compound will be reacted with the acidic substance. On this basis, many of the strong mineral acids cannot be used in the working of this invention. Relatively weak inorganic acids such as carbonic acid (saturated aqueous solution) and boric acid give good results.

However, for the purposes of this invention, the preferred acidic substances are organic. An organic substance for use in this invention has the following features:

1. It has at least two carbon atoms (including the carbon atoms of any carboxyl groups present);
2. It has acidity derived from the presence thereon of at least one carboxyl group and/or at least one sulphonic acid group.

It is essential that the addition of from 0.05–5% by weight of the total composition of organic compound to a mixture of 25% aluminium hydroxide/hydroxysulphate and the remainder water should produce a mixture with pH of below 7, preferably from 4–6. Thus, large molecules such as polymers which contain relatively few acid groups are not suitable organic compounds for the purposes of this invention.

The compounds which give the best results are the $C_1$–$C_6$ alkanoic acids, particularly ethanoic (acetic) acid. Good results are also given by a number of dicarboxylic acids, particularly oxalic, adipic, succinic and glutaric acids. Sulphonic acid-containing compounds which give good results include amidosulphonic acid, benzenesulphonic acid and methanesulphonic acid.

The organic compounds may be in solid or liquid form. As the admixture is generally added as an aqueous solution or dispersion at the nozzle, the components of the admixture are blended into water in the appropriate concentrations which is then injected into the nozzle. The proportions of the components by weight are aluminium hydroxide/hydroxysulphate 10–35%, organic compound 0.1–10% and water 50–90%. The preferred ranges are 20–30%, 0.5–5% and 65–80% respectively. It is a particular feature of this invention that the liquid admixtures which are ready for use (or a liquid concentrate suitable for dilution) are storage-stable for long periods.

In addition to these essential components, there may also be added other components which improve the composition in some way. One such component is ethylene glycol, added typically at a rate of up to 30% by weight of the total composition. This helps to further stabilize the composition.

Other additional components can improve the properties of the sprayed cementitious compositions. Two of these are amines and polymers comprising carboxylic moieties. The amines are preferably alkanolamines, especially diethanolamine and triethanolamine, present preferably to the extent of from 0.1–5%, preferably from 0.5–2% by weight of the total admixture.

The polymers useful in this aspect of the invention are any polymers which bear suitable pendant carboxylic moieties. The carboxylic moiety may be a carboxyl group, and any polymer having such groups and complying with the other parameters hereinunder described will work in this invention. Examples include poly(acrylic) and poly(methacrylic) acids and mixtures thereof and copolymers of meth(acrylic) acid with other comonomers. However, preferred polymers are of the "comb" type, that is, polymers comprising a polymer backbone (whose chemical nature is generally irrelevant to the working of the invention) with carboxyl group-containing moieties pendant therefrom. The pendant carboxy group-containing moieties may be up to 100 units long and may comprise monomer residues of, for example (meth)acrylic acid, maleic acid or fumaric acid. It is preferred that the moieties be completely made up of (meth) acrylic acid residues.

A preferred backbone is a random addition polymer, one of the monomers of which comprised, prior to polymerization, more than one, and preferably two, polymerizable double bonds. A preferred monomer with more than one double bond is butadiene and a preferred copolymer is a styrene-butadiene copolymer. To such a copolymer (which may have pendant and/or in-chain polymerizable double bonds) carboxyl group-containing monomers such as acrylic acid, methacrylic acid, maleic acid or fumaric acid may be graft copolymerized. Examples or preferred copolymers are styrene-butadiene copolymerized with acrylic acid and styrene/butadiene/maleic (or fumaric) acid terpolymer.

The polymers of this invention have weight average molecular weights in excess of 20,000 and are solids at room temperature. They also have a limited solubility in water, being at best dispersible (never completely soluble), but they are highly soluble in alkaline media (such as a fluid cementitious mix). In the case of poly(meth)acrylic acid and polymers which are inherently soluble in water, it is possible to prepare such polymers in such a form that the necessary solubility is achieved, for example, particulate form. They are added to the cementitious mix as an aqueous dispersion such that the quantity of polymer by weight on cement is from 0.01% to 3%.

Typical examples of suitable commercial materials are those available under the trade mark "Synthomer" (ex Synthomer Chemie GmbH, Frankfurt/Main, Germany). An especially suitable example is "Synthomer" 9523 (a methacrylic acid styrene-butadiene copolymer). Another suitable commercial product is "Polyacryl" AD (ex Polygon Chemie AG, Olten, Switzerland).

The combination of aluminium hydroxide/hydroxysulphate, amine and polymer as herein above described for use in cementitious spraying compositions is described in corresponding British patent application 9416114, the contents whereof are incorporated herein by reference. It has now been found that the inclusion of acid containing accelerator as herein above described results in significant improvements in properties such as strength development. The invention therefore also provides a process of spraying a cementitious composition on to a substrate from a nozzle, comprising the addition to the composition at the nozzle of an accelerating admixture as hereinabove defined. The invention also provides a sprayed cementitious composition on a substrate, comprising an accelerating admixture as hereinabove described.

The invention is further described with reference to the following examples.

EXAMPLES 1–36

A standard mortar composition is prepared by mixing the following components:

| | | |
|---|---|---|
| standard sand (DIN EN 196-1) | 1800 | parts |
| portland cement | 450 | parts |
| water | 200 | parts |
| superplasticiser* | 4.5 | parts |
| acid-containing accelerator | 18 | parts |

*"Rheobuild (Trade Mark) 3520 ex MBT (Schweiz).

The acid-containing accelerator is a mixture of water, an acid and a commercially-available aluminium hydroxysulphate ("Gezedral" (Trade Mark) L ex Giulini Chemie GmbH is used). The acids used may be found listed in Tables 1–4 hereinunder. In addition to these materials, there may also be present materials which are identified Tables 1–4:

| | |
|---|---|
| DEA - | diethanolamine |
| TEA - | triethanolamine |
| Rh 3520 - | "Rheobuild" (trade mark) 3520 styrene-maleic anhydride copolymer superplasticiser |
| copolymer - | "Synthomer" 9523 acrylic copolymer |
| Rh 3040 - | "Rheobuild" 3040 styrene-maleic anhydride copolymer superplasticiser |
| Al - | "Gezedral" L aluminium hydroxysulphate |
| Melment - | "Melment" (trade mark) melamine sulphonate superplasticiser |

The polyacrylic acid used in Examples 3, 28, 29, 30, 34, 35 and 36 has a weight-average molecular weight of 5,000.

The acid-containing accelerator is prepared as follows:

The acid is added to the water under stirring. When it is dissolved, the alkanolamine (when used) and the copolymer (when used) is/are added, and stirring is continued until the mixture is homogeneous. The plasticizer (when used) is then added under stirring. This mixture is stirred for 3 minutes. Finally, the aluminium hydroxysulphate is added continuously while stirring.

The mortar compositions are tested for setting time and compressive strength and the results are shown in Tables 1–4.

TABLE 1

| Example No. | 1 | 2 | 3 | 4 | 5 | 6 | 7 | 8 |
|---|---|---|---|---|---|---|---|---|
| Materials | | | | | | | | |
| water | 65.00 | 65.00 | 65.00 | 65.00 | 65.00 | 65.00 | 65.00 | 44.00 |
| salicylic acid | 5.00 | | | | | | | |
| oxalic acid | | 5.00 | | | | | | |
| polyacrylic acid | | | 5.00 | | | | | |
| amidosulphonic acid | | | | 5.00 | | | | |
| propionic acid | | | | | 5.00 | | | |
| benzoic acid | | | | | | 5.00 | | |
| citric acid | | | | | | | 5.00 | 16.00 |
| VEA | | | | | | | | 10.00 |
| AT | 30.00 | 30.00 | 30.00 | 30.00 | 30.00 | 30.00 | 30.00 | 30.00 |
| initial set time (min.) | 20' | 8' | 55' | 55' | 6.5' | 22' | 10' | 26' |
| final set time (min.) | 60' | 30' | | | | | 20' | 41' |
| 24 h. (N/mm$^2$) | | 18.0 | 14.4 | 17.7 | 17.2 | 16.7 | 2.9 | |
| 2 d. (N/mm$^2$) | | | | | | | 16.2 | 0.8 |
| 7d. (N/mm$^2$) | | | | | | | 23.9 | 33.1 |

TABLE 2

| Example No. | 9 | 10 | 11 | 12 | 13 | 14 | 15 | 16 | 17 | 18 |
|---|---|---|---|---|---|---|---|---|---|---|
| Materials | | | | | | | | | | |
| water | 60.00 | 60.00 | 60.00 | 60.00 | 60.00 | 66.00 | 66.00 | 66.00 | 66.00 | 65.00 |
| methane sulphoric acid | 2.00 | | | | | | | | | |
| benzenesulphonic acid | | 2.00 | | | | | | | | |
| propionic acid | | | 2.00 | | | | | | | |
| methacrylic acid | | | | 2.00 | | | | | | |
| acetic acid | | | | | 2.00 | | | | | |
| gluconic acid | | | | | | 2.00 | | | | |
| malic acid | | | | | | | 2.00 | | | |

TABLE 2-continued

| Example No. | 9 | 10 | 11 | 12 | 13 | 14 | 15 | 16 | 17 | 18 |
|---|---|---|---|---|---|---|---|---|---|---|
| tartaric acid | | | | | | | | 2.00 | | |
| polyethylene glycolic acid | | | | | | | | | 2.00 | |
| gluconic acid | | | | | | | | | | 5.00 |
| Rh 3520 | 8.00 | 8.00 | 8.00 | 8.00 | 8.00 | | | | | |
| Al | 30.00 | 30.00 | 30.00 | 30.00 | 30.00 | 30.00 | 30.00 | 30.00 | 30.00 | 30.00 |
| initial set time (min.) | | | | | | | 5' | 8'30" | 6' | |
| final set time (min.) | | | | | | | 11' | 16' | 21' | |
| 6h. ($N/mm^2$) | | 2.0 | 2.1 | 2.5 | 2.2 | | | 0.5 | 0.7 | |
| 24h. ($N/mm^2$) | 18.7 | 18.0 | 18.2 | 16.4 | 17.3 | 13.0 | 13 | 10.9 | 13 | 13.4 |
| 2d. ($N/mm^2$) | | | | | | 17.4 | 22.5 | 21.4 | 18.4 | 25.6 |
| 7d.($N/mm^2$) | | | | | | | | | | |

TABLE 3

| Example No. | 19 | 20 | 21 | 22 | 23 | 24 | 25 | 26 | 27 | 28 | 29 | 30 |
|---|---|---|---|---|---|---|---|---|---|---|---|---|
| Materials | | | | | | | | | | | | |
| water | 61.00 | 60.50 | 61.00 | 60.50 | 61.00 | 60.50 | 63.00 | 61.4 | 59.00 | 62.00 | 60.40 | 58.00 |
| tartaric acid | 1.00 | 1.00 | | | | | | | | | | |
| gluconic acid | | | 1.00 | 1.00 | | | | | | | | |
| oxalic acid | | | | | 1.00 | 1.00 | 1.00 | 1.00 | 1.00 | | | |
| polyacrylic acid | | | | | | | | | | 2.00 | 2.00 | 2.00 |
| copolymer | | | | | | | 6.00 | 6.00 | 6.00 | 6.00 | 6.00 | 6.00 |
| TEA | | 0.50 | | 0.50 | | 0.50 | | | | | | |
| Melment | | | | | | | | 1.6 | | | 1.6 | |
| Rh 3040 | | | | | | | | | 4.00 | | | 4.00 |
| Rh 3520 | 8.00 | 8.00 | 8.00 | 8.00 | 8.00 | 8.00 | | | | | | |
| Al | 30.00 | 30.00 | 30.00 | 30.00 | 30.00 | 30.00 | 30.00 | 30.00 | 30.00 | 30.00 | 30.00 | 30.00 |
| initial set time (min.) | 5'00" | 5'00" | 3'50" | 3'50" | 3'10" | 3'15" | 4'30" | 3'30" | 4'00" | 4'30" | 4'35" | 5'00" |
| final set time (min.) | 10'00" | 8'00" | 7'00" | 8'00" | 6'15" | 6'30" | 15'20" | 15'50" | 9'00" | 8'30" | 8'30" | 9'15" |
| 6h. ($N/mm^2$) | 1.9 | 1.4 | 1.9 | 1.7 | 2.6 | 2.1 | 1.5 | 1.4 | 1.6 | 1.6 | 1.7 | 1.4 |
| 24h. ($N/mm^2$) | 17.7 | 20.3 | 15.5 | 15 | 19.5 | 19.7 | 17.0 | 16.3 | 16.9 | 16.0 | 16.65 | 15.1 |

TABLE 4

| Example No. | 31 | 32 | 33 | 34 | 35 | 36 |
|---|---|---|---|---|---|---|
| Materials | | | | | | |
| water | 62.70 | 61.10 | 58.7 | 61.4 | 59.80 | 57.4 |
| oxalic acid | 1.30 | 1.30 | 1.30 | | | |
| polyacrylic acid | | | | 2.60 | 2.60 | 2.6 |
| copolymer | 6.00 | 6.00 | 6.00 | 6.00 | 6.00 | 6.00 |
| Melment | | 1.60 | | | 1.6 | |
| Rh 3040 | | | 4.00 | | | 4.00 |
| Al | 30.00 | 30.00 | 30.00 | 30.00 | 30.00 | 30.00 |
| initial set time (min.) | 2'40" | 2'30" | 3'20" | 3'00" | 2'40" | 3'30" |
| final set time (min.) | 13'20" | 7'30" | 7'30" | 11'30" | 9'30" | 12'30" |
| 6h. ($N/mm^2$) | 1.2 | 1.2 | 1.2 | 1.0 | 1.3 | 0.9 |
| 24h. ($N/mm^2$) | 17.1 | 17.7 | 16.8 | 15.2 | 16.4 | 14.9 |
| 2d. ($N/mm^2$) | 22.3 | 23.9 | 24.5 | 21.8 | 23.9 | 23.4 |
| 7d. ($N/mm^2$) | | | | | | |

EXAMPLES 37–40

A number of aluminium hydroxysulphate-based compositions are made up using the materials shown in Table 5 and are tested for shelf-storage. The compositions were tested at two different temperatures, 20° C. and 35° C. over a number of days, and the test methods are pH, Ford cup DIN No. 4 time and RVT Brookfield viscosity (spindle No. 1 at 50 rpm for low viscosity materials (less than 200 mPas), No. 2 at 50 rpm for viscosities greater than 200 mPas and No. 7 at 20 rpm for pastes). The results are shown in Tables 6 and 7.

TABLE 5

| Example No. | 37 | 38 | 39 | 40 |
|---|---|---|---|---|
| "Gezedral" L | 30.00 | 30.00 | 30.00 | 30.00 |
| acetic acid | 1.00 | — | — | — |
| oxalic acid | — | 1.00 | — | — |
| tartaric acid | — | — | 8.00 | — |
| "Synthomer" | 12.00 | 12.00 | 12.00 | 12.00 |
| "Rheobuild" 3520 | 4.00 | 4.00 | 4.00 | 4.00 |
| antifoam* | 0.05 | 0.05 | 0.05 | 0.05 |
| water | 52.95 | 52.95 | 52.95 | 53.95 |

*"Agitan" (trade mark) (silicone-based defoamer, 4% active material)

TABLE 6

20° C.

| Example No. | | 37 | 38 | 39 | 40 |
|---|---|---|---|---|---|
| pH | on mixing | 5.0 | 5.5 | 5.5 | 6.2 |
| | after 1 day | 5.3 | 5.8 | 5.6 | 6.3 |
| | after 7 days | 5.6 | 6.0 | 5.9 | 5.6 |
| Ford cup (sec) | on mixing | 17.00 | 15.00 | 15.00 | — |
| | after 1 day | 17.00 | 15.00 | 15.00 | — |
| | after 7 days | 18.00 | 17.00 | 15.00 | — |
| Brookfield viscosity (mPas) | on mixing | 51.00 | 44.00 | 45.00 | 54000 |
| | after 1 day | 51.00 | 44.00 | 45.00 | — |
| | after 7 days | 96.00 | 92.00 | 44.00 | 56000 |

TABLE 7

| | | 35° C. | | | |
|---|---|---|---|---|---|
| Example No. | | 37 | 38 | 39 | 40 |
| pH | on mixing | 5.0 | 5.5 | 5.0 | 6.1 |
| | after 1 day | 5.0 | 5.5 | 5.0 | 6.1 |
| | after 7 days | 5.6 | 6.0 | 5.9 | 5.6 |
| Ford cup (sec) | on mixing | 17.00 | 15.00 | 15.00 | — |
| | after 1 day | 17.00 | 15.00 | 15.00 | — |
| | after 7 days | 39.00 | 47.00 | 23.00 | — |
| Brookfield viscosity (mPas) | on mixing | 51.00 | 44.00 | 45.00 | 54000 |
| | after 1 day | 51.00 | 44.00 | 45.00 | — |
| | after 7 days | 204.00 | 496.00 | 140.00 | 120000 |

It can be seen that the viscosity of the material of Example 40 is initially high and increases considerably, while the compositions according to the invention remain fluid. There are no Ford cup measurements for the material of Example 40 because it is too viscous to flow through a Ford cup. One feature of the compositions of the present invention is that, after seven days, the pH rises slightly and then stabilizes, remaining essentially unaltered at this figure for several months.

We claim:

1. An aqueous accelerating admixture for a sprayable cementitious composition, comprising:

(a) aluminum hydroxysulphate, or a mixture of aluminum hydroxide and aluminum hydroxysulphate, and (b) an acidic substance which essentially does not react with the said mixture said acidic substance selected from the group consisting of: weak inorganic acids, $C_1$–$C_6$ alkanoic acids, oxalic acid, adipic acid, succinic acid, citric acid, glutaric acid, gluconic acid, malic acid, tartaric acid, polyethylene glycolic acid, benzoic acid, methacrylic acid, salicylic acid, amidosulphonic acid, benzenesulphonic acid, methanesulphonic acid, and mixtures therof.

2. An accelerating admixture according to claim 1 wherein the acidic substance is a substance which when included in the accelerating admixture reacts with less than 10% of the mixture of aluminum hydroxide and aluminum hydroxysulphate.

3. An accelerating admixture according to claim 1, which further includes up to 30% by weight of ethylene glycol based on the total weight of the admixture.

4. An accelerating admixture according to claim 1 which further includes at least one amine.

5. An accelerating admixture according to claim 1 which further includes at least one polymer comprising having a carboxylic moiety.

6. An accelerating admixture according to claim 5 wherein the polymer is one or more selected from the group consisting of: poly(acrylic) acid, poly(methacrylic) acid, and copolymers including meth(acrylic) acid groups.

7. An accelerating admixture according to claim 5, wherein the polymer is a comb type polymer having a polymeric backbone and at least one carboxyl group-containing moieties depending therefrom.

8. An accelerating admixture according to claim 5, wherein the polymer is a comb type polymer comprising styrene-butadiene units.

9. An accelerating admixture according to claim 7, where in the polymer is a comb type polymer comprising styrene-butadiene units graft polymerized with at least one further graft monomer derived from acrylic acid, methacrylic acid, maleic acid, or fumaric acid.

10. An accelerating admixture according to claim 7 wherein the polymer is a methacrylic acid-styrene-butadiene copolymer.

11. An accelerating admixture according to claim 5 wherein the polymer has a weight average molecular weight of at least 20,000.

12. An accelerating admixture for a sprayable cementitious composition according to claim 1 consisting essentially of and based on the total weight of the said admixture:

(a) a mixture of aluminum hydroxide and aluminum hydroxysulphate; and (b) an acidic substance which essentially does not react with the said mixture, to 100 wt % of water.

13. An accelerating admixture for a sprayable cementitous composition according to claim 12, consisting essentially of, and based on the total weight of the said admixture:

10–35% wt. of (a) a mixture of aluminum hydroxide and aluminum hydroxysulphate; and, 0.1–10% wt. of (b) an acidic substance which essentially does not react with the said mixture, said acidic substance selected from the group consisting of: weak inorganic acids, $C_1$–$C_6$ alkanoic acids, oxalic acid, adipic acid, succinic acid, citric acid, glutaric acid, gluconic acid, malic acid, tartaric acid, polyethylene glycolic acid, benzoic acid, methacrylic acid, salicylic acid, amidosulphonic acid, benzenesulphonic acid, methanesulphonic acid, and mixtures therof, 0–30% wt. of ethylene glycol;

5% wt. of an amine;

0–3% wt. of a polymer comprising carboxylic moieties;

to 100% wt. of water.

14. An accelerating admixture for a sprayable cementitious composition according to claim 13, wherein the amine is an alkanolamine.

15. A fluid, aqueous accelerating admixture for a sprayable cementitous composition, consisting essentially of:

(a) a compound selected from the group consisting of: aluminum hydroxysulphate, and mixtures of aluminum hydroxide with aluminum hydroxysulphate, and (b) an acidic substance which essentially does not react with the said compound. optionally at least one further constituent selected from the group consisting of: ethylene glycol, amines, and polymers comprising having a carboxylic moiety.

16. An accelerating admixture according to claim 15, wherein the acidic substance is a substance which when included in the accelerating admixture reacts with less than 10% of the compound selected from the group consisting of: aluminum hydroxysulphate, and mixtures of aluminum hydroxide and aluminum hydroxysulphate.

17. An accelerating admixture according to claim 15, wherein the acidic substance is an organic substance which has at least two carbon atoms; and which derives its acidity from the presence thereon of at least one carboxyl group or at least one sulphonic acid group.

18. An accelerating admixture according to claim 15, wherein the acidic substance is selected from the group consisting of: weak organic acids. $C_1$–$C_6$ alkanoic acids, boric acid, carbonic acid, oxalic acid, adipic acid, succinic acid, citric acid, glutaric acid, gluconic acid, malic acid, tartaric acid, polyethylene glycolic acid, amidosulphonic acid, benzenesulphonic acid, benzoic acid, methanesulphonic acid, methacrylic acid, salicylic acid, and mixtures therof.

19. An accelerating admixture according to claim 15 wherein the polymer has a weight average molecular weight of at least 20,000 and is one or more selected from the group consisting of: poly(acrylic) acid, poly(methacrylic) acid, and copolymers including meth(acrylic) acid groups, and comb type polymers comprising styrene-butadiene units graft polymerized with at least one further graft monomer derived from acrylic acid, methacrylic acid, maleic acid, or fumaric acid.

* * * * *